United States Patent [19]
Gorce et al.

[11] Patent Number: 5,665,812
[45] Date of Patent: Sep. 9, 1997

[54] FUNCTIONAL DIENE POLYMERS, THEIR METHOD OF PREPARATION AND THEIR USE IN SILICA-FILLED ELASTOMERIC COMPOSITIONS WHICH CAN BE USED FOR TIRES

[75] Inventors: Jean-Noël Gorce, Riom; Gérard Labauze, Clermont-Ferrand, both of France

[73] Assignee: Compagnie Generale des Establissements Michelin-Michelin & Cie, Clermont-Ferrand Cedex, France

[21] Appl. No.: 415,523

[22] Filed: Apr. 3, 1995

[30] Foreign Application Priority Data

Jul. 15, 1994 [FR] France ................... 94 08887

[51] Int. Cl.$^6$ ................ C08K 3/04; C08K 9/06; C08F 8/00
[52] U.S. Cl. ................ 524/495; 523/213; 525/105; 525/342
[58] Field of Search ............. 523/213; 524/495; 525/105, 342

[56] References Cited

U.S. PATENT DOCUMENTS

| | | |
|---|---|---|
| 3,135,716 | 6/1964 | Uraneck et al. . |
| 3,244,644 | 4/1966 | Stiles . |
| 3,281,383 | 10/1966 | Zelinski et al. . |
| 3,773,732 | 11/1973 | Dillenschneider . |
| 4,185,042 | 1/1980 | Verkouw . |
| 5,066,721 | 11/1991 | Hamada et al. . |
| 5,409,969 | 4/1995 | Hamada .................. 523/213 |

*Primary Examiner*—Kriellion S. Morgan
*Attorney, Agent, or Firm*—Brumbaugh, Graves, Donohue & Raymond

[57] ABSTRACT

A sulfur-vulcanizable rubber composition of improved hysteresis, comprising silica as reinforcing filler as well as a diene polymer functionalized with a functionalizing agent having the general formula $(Y)_m\text{—R—Si}(OR^2)_{3-n}\text{—R}^3 n$ and suitable to be used for the manufacture of tires of reduced resistance to rolling.

The functionalized diene polymers are prepared by addition to the living diene polymer under suitable mixing conditions of an amount of functionalizing agent such that the molar ratio of functionalizing agent to the number of active sites is equal to or greater than 1.

24 Claims, 2 Drawing Sheets

FUNCTIONAL DIENE POLYMERS, THEIR METHOD OF PREPARATION AND THEIR USE IN SILICA-FILLED ELASTOMERIC COMPOSITIONS WHICH CAN BE USED FOR TIRES

BACKGROUND OF THE INVENTION

The present invention relates to functionalized diene polymers having improved properties of use in unvulcanized state and hysteresis properties in vulcanized state in elastomeric compositions comprising silica as filler, to their use in tires, and to a new process of preparing the said functionalized polymers.

Since savings in fuel and the necessity of protecting the environment have become a priority, it is desirable to produce polymers having good mechanical properties and a hysteresis which is as slight as possible in order to be able to use them in the form of rubber compositions which can be employed for the manufacture of various semi-finished products entering into the constitution of tires, such as, for instance, under-layers, bonding rubbers between rubbers of different kinds or calendering rubbers for metal or textile reinforcements, sidewall rubbers, or treads, and to obtain tires having improved properties, in particular reduced resistance to rolling.

In order to achieve this, numerous solutions have been proposed, which consist, in particular, of modifying, inter alia, the nature of the diene polymers and copolymers for polymerization by means of coupling or starring agents or functionalizing agents. The great majority of these solutions are concentrated essentially on the use of polymers modified with carbon black as reinforcing filler in order to obtain good interaction between the modified polymer and the carbon black, since the use of white reinforcing fillers, and in particular of silica, has proven unsuitable due to the low level of certain properties of such compositions and, therefore, of certain properties of tires using these compositions. Furthermore, the use of silica raises difficulties in working due to silica/silica interactions which tend in the raw state to cause an agglomeration of the silica particles before and even after mixing and thus to increase the consistency of the rubber compositions, and in any event to make the use of them more difficult than the use of carbon black. By way of illustrative examples of this prior art, we may cite U.S. Pat. No. 3,135,716, which describes the reaction of living diene polymers at the chain end with a polyfunctional organic coupling agent in order to obtain polymers having improved properties; U.S. Pat. No. 3,281,383 which, as coupling or grafting agents of living diene polymers, describes polyepoxides, polyisocyanates, polyimines, polyaldehydes, polyketones, polyanhydrides, polyesters, and polyhalides, including polyhalogenated compositions of silicon; U.S. Pat. No. 3,244,664 which describes tetraalkoxysilanes as coupling and/or starring agents for diene polymers; French Patent 69 24444, which describes, as starring agent, compositions comprising either the —O—C(O)—O— group or the —O—C(O)—R—C(O)—O— group and which leads to diene polymers having improved properties of use and improved properties in vulcanized state. In U.S. Pat. No. 4,185,042 there has been described the use of silicon compounds comprising an epoxide group as coupling and/or starring agent of diene polymers for the preparing of coupled and/or starred polymers. The coupling and/or starring agent is present in an amount of 0.05 to 4 moles per mole of living polymer or copolymer, and it is reacted with the living polymer under operating conditions which lead to a coupling and/or starring reaction. The coupled or starred polymers described in that patent have the properties both of an elastomer and of a thermoplastic. No reference is made to filled mixtures, and nothing permits the person skilled in the art to believe that such coupled or starred polymers could be of interest for compositions comprising silica as reinforcing filler. More recently, in the European Polymer Journal, Vol. 17, 1981, pages 213 to 220, A. Crespy and M. J. Abadie have described polystyrene and polyisoprene oligomers functionalized by opening of the epoxy ring by means of 3-glycidoxypropyl-trimethoxysilane (GPTSI) obtained by pouring the living oligomers prepared by anionic catalysis drop-by-drop onto the functionalizing agent, and then deactivating with methanol. It is stated that the yield is improved when GPTSI is placed in solution in tetrahydrofuran (THF). On pages 221 to 227 of this same volume, these authors describe certain polymers functionalized by GPTSI which are obtained by first of all preparing the polymer by anionic polymerization, then subjecting it to metalation by means of naphthalene lithium in excess, and then pouring the living polymer, drop by drop, onto a solution of GPTSI in excess. The functionalization process described by these authors is entirely unusable industrially.

The interest in using silica as reinforcing filler in elastomer compositions has existed for a long time, but the use of silica as reinforcing filler has remained very limited due to the drawbacks mentioned above, and this despite the attempts made to remedy the deficiency of the properties exhibited by such compositions. Thus, it has been proposed to use functionalized diene polymers instead of non-functionalized polymers. By way of example of such a prior art, mention may be made of European Patent Application EP-0 299 074, which describes a silica-filled diene rubber having a base of a diene polymer functionalized by means of a silane having a non-hydrolyzable alkoxy radical. European Patent Application EP-0 447 066 describes a silica-filled composition containing a diene polymer functionalized by means of a halogenated silane compound. Despite the improvement in the properties obtained with the use of such functionalized polymers, the silica compositions described in this prior art have not proved to be usable for forming the treads of tires, since the properties exhibited, although improved, nevertheless remain insufficient with respect to the level required. This interest in silica-reinforced compositions has recently been reawakened with the publication of European Patent Application EP-0 501 227, which discloses a sulfur-vulcanizable rubber composition obtained by thermo-mechanical working of a conjugated diene copolymer and an aromatic vinyl compound prepared by solution polymerization with 30 to 150 parts by weight to 100 parts by weight of elastomer of a special precipitated silica obtained by the process forming the object of European Patent Application EP-0 157 703, which represents an excellent compromise between several contradictory properties and, which for the first time, permits the marketing of tires having a silica-filled tread which actually possesses the required excellent compromise.

It is known to the person skilled in the art that functionalized diene polymers which confer very interesting properties on compositions containing silica as reinforcing filler are obtained with the tetra-alkoxysilanes and in particular tetramethoxysilane (TMSI), used as functionalizing agents. This can be noted, for instance, from U.S. Pat. No. 3,244,664, already cited, which mentions the orthosilicates and describes compositions exhibiting improved properties employing polymers modified with tetraethoxysilane.

The teaching that the tetra-alkoxysilane components are the most interesting potentially for reacting at the chain end with respect to the silica can also be noted from European Patent Application EP-0 299 074, already cited, which in its turn refers to Japanese Patent Application JP-56/104 906, which describes tetraalkoxysilane functionalizing agents and teaches that while these compounds very significantly increase the properties of the polymers, the polymers which are thus functionalized when they are subjected to a steam stripping in order to eliminate the polymerization solvent undergo a macrostructural development which leads to a severe degradation of the potentially interesting properties. Furthermore, this development is very difficult to control.

SUMMARY OF THE INVENTION

It is therefore desirable to obtain functionalized diene polymers having substantially the same level of properties as those functionalized with TMSI, which is potentially the most reactive of the tetra-alkoxysilanes, but by means of a suitably controlled process which permits the use of conventional industrial means, in particular the steam stripping operation.

The object of the present invention is to obtain functionalized diene polymers capable of conferring improved properties, particularly of hysteresis and reinforcement, on elastomer compositions containing silica as reinforcing filler.

The present invention also has as its object certain functionalized diene polymers as novel industrial products.

The invention furthermore has as its object a new process of preparing functionalized diene polymers which is capable of being used with the customary industrial techniques and, in particular, which permits the use of steam stripping.

The invention also concerns new rubber compositions containing silica as reinforcing filler having a base of functionalized diene polymers having satisfactory properties of use in raw state and improved properties in vulcanized state, in particular better hysteresis and better reinforcement.

The invention furthermore concerns tire treads and tires having improved properties, particularly reduced resistance to rolling.

The present invention provides a new method of preparing functionalized diene polymers which consists in preparing in known manner a living diene polymer having one or more living chain ends, adding, by mixing, to said living polymer an amount of a functionalizing agent of general formula I:

$$(Y)_m - R^1 - Si(OR^2)_{3-n} - R^3{}_n$$

in which

Y represents the radical

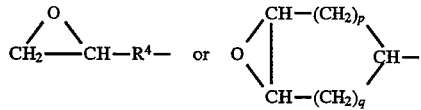

$R^1$ represents an alkyl, cycloalkyl, or aryl radical having from 1 to 10 carbon atoms, $R^2$ represents an alkyl, aryl, cycloalkyl, alkaryl, or aralkyl radical having from 1 to 12 carbon atoms, $R^3$ represents an alkyl, aryl, or alkaryl radical having from 1 to 12 carbon atoms, $R^4$ represents a hydrocarbon radical having from 1 to 6 carbon atoms and which may comprise one or more oxygen atoms in the hydrocarbon chain, n is a whole number selected from among the values 0 and 1, m is a whole number selected from among the values 1 and 2, p and q are whole numbers selected from among the values 0, 1, 2, 3 and 4, it being understood that the sum of p+q must represent a whole number between 2 and 5 inclusive, such that the molar ratio (MR) of functionalizing agent to number of active sites of the initiator is equal to or greater than 1, and then allowing the living polymer to react with the functionalizing agent and recovering the functionalized polymer.

By functionalized diene polymers there are understood herein all polymers completely or substantially functionalized with a compound of general formula I which at the same time satisfy the following 2 ratios:

$$PF = \frac{Ns}{Np \times (fn)} \geq 0.85 \text{ and } PV = \frac{Ne}{Ns \times m} \geq 0.90$$

in which:

Ns represents the number of moles of silicon bound to one polymer chain end of the functionalized polymer, Np represents the number of polymer moles before functionalization, f(n) represents the functionality of the polymerization initiator, Ne represents the number of moles of epoxy function bound to a polymer chain end of the functionalized polymer, m has the meaning indicated above.

The number of moles of silicon and the number of moles of epoxy function present in the functionalized polymer can be determined by measurement by means of techniques known to the person skilled in the art, such as nuclear magnetic resonance (NMR), colorimetry, etc.

The number Np is obtained by the weight ratio of polymer to the number molecular weight of the polymer, the latter being determined by osmometry or tonometry.

Among the agents satisfying general formula I there are preferably suitable 2-glycidoxyethyltrimethoxysilane, 3-glycidoxypropyl-trimethoxysilane (GPTSI), 3-glycidoxypropyl-triethoxysilane, and 2-(3,4-epoxycyclohexyl)-ethyltri-methoxysilane (ECETSI).

By diene polymers there is understood any homopolymer obtained by polymerization of a conjugated diene monomer having from 4 to 12 carbon atoms or any copolymer obtained by copolymerization of one or more conjugated dienes with each other or with one or more aromatic vinyl compounds having from 8 to 20 carbon atoms. As conjugated dienes there are suitable, in particular, butadiene-1,3, 2-methyl-1,3-butadiene, the 2,3-di($C_1$ to $C_5$ alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene, 2,4-hexadiene, etc.

As aromatic vinyl compounds there are suitable, in particular, styrene, ortho-, meta-, and para-methylstyrenes, the commercial "vinyl-toluene" mixture, para-tertiobutylstyrene, the methoxy-styrenes, the chloro-styrenes, vinyl mesitylene, divinyl benzene, vinyl naphthalene, etc.

The copolymers may contain between 99% and 20% by weight of diene units and 1% to 80% by weight of aromatic vinyl units. The polymers may have any microstructure, this being a function of the polymerization conditions used, in particular the presence or absence of a modifying and/or randomizing agent and the quantities of modifying and/or randomizing agents used. The polymers may be block, statistical, sequenced, microsequenced polymers, etc., and may be prepared by dispersion or in solution.

Polybutadienes are preferred particularly those having a content of between 4% and 80% 1,2-units, polyisoprenes, butadiene-styrene copolymers, in particular those having a styrene content of between 5% and 50% by weight and, more particularly, between 20% and 40% by weight, a content of 1,2 bonds of the butadiene part of between 4% and 65%, and a content of trans-1,4 bonds of between 30% and 80%. In the case of butadiene-styrene-isoprene copolymers, there are suitable those having a styrene content of between 5 and 50% and, more particularly, between 10% and 40%, an isoprene content of between 15% and 60% by weight, and more particularly between 20% and 50% by weight, a butadiene content of between 5 and 50%, and more particularly between 20% and 40% by weight, a content of 1,2 units of the butadiene part of between 4% and 85%, a content of trans-1,4 units of the butadiene part of between 6% and 80%, a content of 1,2 plus 3,4 units of the isoprene part of between 5% and 70%, and a content of trans-1,4 units of the isoprene part of between 10% and 50%.

One can use any known mono- or polyfunctional anionic or non-anionic initiator as polymerization initiator. However, an initiator containing an alkaline metal such as lithium or an alkaline-earth metal such as barium is preferably employed. As organolithium initiators there are suitable, in particular, those having one or more carbon-lithium bonds. Representative compounds are the aliphatic organolithiums such as ethyl-lithium, n-butyl-lithium (N-BuLi), isobutyl-lithium, the dilithium polymethylenes such as 1,4-dilithiobutane, etc. Representative compounds containing barium are those described in patent applications FR-2 302 311 and FR-2 273 822 and certificates of addition FR-2 338 953 and FR-2 340 958, the content of which is incorporated herein.

By number of active sites there is understood the number of sites actually available to initiate the polymerization.

As known per se, the polymerization is preferably carried out in the presence of an inert solvent, which can, for instance, be an aliphatic or alicyclic hydrocarbon such as pentane, hexane, heptane, iso-octane or cyclohexane, or an aromatic hydrocarbon such as benzene, toluene or xylene.

The polymerization can be carried out continuously or batchwise. The polymerization is generally carried out at a temperature of between 20° C. and 120° C. and preferably close to 30° to 90° C. One can, of course, also add a transmetalation agent at the polymerization end in order to modify the reactivity of the living chain end.

It is essential that the addition of the functionalizing agent to the living polymer be effected by means of a suitable mixing which is directed at achieving the highest level of micromixture before the two components can significantly react with each other in appreciable amount in order to obtain a degree of homogeneity such as substantially to permit only the reaction of a single reactive site of the living polymer with a single $SiOR^2$ group of the functionalizing agent. For this purpose, the characteristic mixing time must be less than or equal to, and preferably far less than, the characteristic reaction time between the two components and furthermore less than, and preferably far less than, the characteristic time of molecular diffusion of the components present.

The mixing can be effected by any suitable means, in particular by means of any static mixer and/or any dynamic mixer known to the person skilled in the art. There are particularly suitable mixing devices which dissipate volumetric powers on the order of 0.1 to 100 kW/m³/dynamic viscosity unit of the reaction mixture in Pa.s and preferably which dissipate volumetric powers of between 1 and 10 kW/m³/Pa.s.

As it is well-known to the person skilled in the art that the mixing temperature of two components capable of reacting chemically with each other is one of the parameters which greatly influence the chemical reaction velocity of the components mixed and the physical properties of the reaction fluid resulting from the mixing, the person skilled in the art will, in order to produce functionalized and/or substantially functionalized diene polymers having predefined properties, certainly adapt the different parameters to each other, in particular the mixing temperature, the mixing device, the intensity of the mixing, and the choice of the molecular ratio MR, it being understood that, from an industrial standpoint, it is economically advantageous to approach a value of MR=1.

The process according to the invention thus makes it possible, with great flexibility, to obtain and direct the functionalization reaction and this to the detriment of the coupling and/or starring reaction. The functional character of the polymer can be determined quantitatively by the person skilled in the art by suitable techniques, known to the person skilled in the art, of determination of the number of moles of silicon and of epoxy function present, such as NMR, colorimetry, etc., and this whatever the mono- or polyfunctional character of the polymer.

The reality of the functionalization reaction can be shown by the two ratios PF and PV. The diene polymers functionalized by the process of the invention have at the same time a ratio PF≧0.85 and PV≧0.90.

The reality of the coupling and/or starring reaction can be shown by means either of the apparent degree of starring (ADS) or of the viscosity jump (VJ). In the case of a monofunctional initiator, the ADS is equal to the ratio of the molecular weights of the functionalized polymer/non-functionalized polymer. The higher this ratio, the more it expresses a large coupling or starring. The viscosity jump (VJ) is equal to the ratio of the inherent viscosity of the functionalized polymer, that is to say of the polymer recovered after reaction with functionalizing agent, to the inherent viscosity of the living polymer stopped with methanol. A ratio of 1 for the viscosity jump expresses a pure functionalization reaction. The higher this ratio, the more it expresses the presence of a coupling and/or starring reaction. The inherent viscosity (dl/g) is measured at 25° C. in a 1 g/liter solution in toluene.

The functionalization can, of course, be carried out with a compound or several compounds satisfying general formula I. The functionalization can be effected in a single step in order to lead to a completely functionalized diene polymer. The functionalization can also be effected in several steps in order to lead to a substantially functionalized diene polymer, that is to say to a polymer having at least 70% of molecules satisfying formula II $(Y)_m$—$R^1$—$Si(OR^2)_2$—P when using a monofunctional initiator or at least 60% of chain ends satisfying formula III $(Y)_m$—$R^1$—$Si(OR^2)_2$—P' when using a polyfunctional initiator, in which $R^1$ represents an alkyl, cycloalkyl, or aryl radical having from 1 to 10 carbon atoms, $R^2$ represents an alkyl, aryl, cycloalkyl, alkaryl, or aralkyl radical having from 1 to 12 carbon atoms, $R^3$ represents an alkyl, aryl, or alkaryl radical having from 1 to 12 carbon atoms, $R^4$ represents a hydrocarbon radical having from 1 to 6 carbon atoms and which may comprise one or more oxygen atoms in the hydrocarbon chain, n is a whole number selected from among the values 0 and 1, m is a whole number selected from among the values 1 and 2, p and q are whole numbers selected from among the values 0, 1, 2, 3 and 4, it being understood that the sum of p+q must represent a whole number between 2 and 5 inclusive, P represents the chain of the diene polymer and P' a diene polymer chain end in the case of a polyfunctional initiator, preferably 80% to 100% and at most 20% of starred or coupled chains. When a modification of the living polymer is effected in two or more steps, the functionalization reaction must always take place last, after the coupling and/or starring reaction, in order that there be functionalization of the living chains not stopped during the preceding step or steps. It is, of course, possible within the scope of a functionalization in several steps, two or more, to functionalize the living polymer with a functionalizing agent different from those satisfying general formula I, such as for instance suitable derivatives of benzophenone or tin, a halogenated or non-halogenated alkoxysilane compound, etc.

It is also possible to use in the first step a compound of formula I as coupling and/or starring agent, in the same way as it is possible to use in the first step any diene polymer coupling and/or starring agent described in the prior art, in particular those, such as the tin derivatives, having an affinity for carbon black. Thus, it is possible to obtain substantially functionalized polymers which are particularly interesting for imparting improved properties, with respect to both silica and carbon black, to compositions containing both silica and carbon black as reinforcing fillers.

Of course, one or more antioxidizing agents can be added to the reaction mixture before recovery of the functionalized polymer. The functionalized polymer is separated from the reaction medium by conventional techniques, that is to say either by coagulation or by steam stripping of the solvent, or by evaporation by any means whatsoever, such as, for instance, evaporation under vacuum and the drying, if necessary.

The process in accordance with the invention, contrary to that of the prior art, can be used economically industrially not only by reason of the rapidity of the functionalization reaction of the living polymer, which is compatible with industrial operation, but also, and primarily, due to the fact that it permits the subsequent elimination of the polymerization solvent present in the functionalized polymer by steam entrainment, conventionally known as stripping, and this without a macrostructural development of the functionalized polymer occurring, which is shown, for instance, by a considerable increase of the Mooney viscosity, contrary to what is the case and well-known to the person skilled in the art with TMSI, which is furthermore considered by the person skilled in the art as a silane functionalizing agent leading to the functionalized polymer most reactive to silica and to compositions containing silica as filler which have excellent properties, in particular with respect to hysteresis. The process of the invention makes it possible to obtain functionalized diene polymers having a Mooney viscosity which may extend over a wide range of between 10 and 150 and preferably between 30 and 100.

The invention also has as its object, by way of novel industrial products, functionalized diene polymers containing at least 70% of molecules satisfying general formula II: $(Y)_m-R^1-Si(OR^2)_2-P$ when the polymerization initiator is monofunctional or has at least 60% of chain ends satisfying general formula III: $(Y)_m-R^1-Si(OR^2)_2-P'$ when the initiator is polyfunctional, in which Y represents the radical

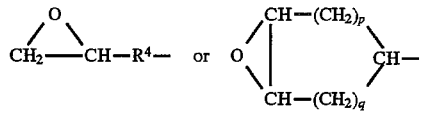

$R^1$ represents an alkyl, cycloalkyl, or aryl radical having from 1 to 10 carbon atoms, $R^2$ represents an alkyl, aryl, cycloalkyl, alkaryl, or aralkyl radical having from 1 to 12 carbon atoms, $R^3$ represents an alkyl, aryl, or alkaryl radical having from 1 to 12 carbon atoms, $R^4$ represents a hydrocarbon radical having from 1 to 6 carbon atoms and which may comprise one or more oxygen atoms in the hydrocarbon chain, n is a whole number selected from among the values 0 and 1, m is a whole number selected from among the values 1 and 2, p and q are whole numbers selected from among the values 0, 1, 2, 3 and 4, it being understood that the sum of p+q must represent a whole number between 2 and 5 inclusive, P represents the polymer chain and P' a polymer chain end of one of the polymers included in the following group:
a homopolymer of 1,3-butadiene, of a 2,3-di($C_1$ to $C_5$ alkyl)-1,3-butadiene, of an aryl-1,3-butadiene and of 2,4-hexadiene, a copolymer of a conjugated diene having from 4 to 12 carbon atoms comprising one or more conjugated dienes and one or more aromatic vinyl compounds and having a Mooney viscosity of between 10 and 150.

Preferably, as new functionalized polymers satisfying general formulas II or III there are suitable polybutadienes, butadiene-styrene copolymers, and more particularly butadiene-styrene copolymers having a styrene content of between 5% and 50% by weight, a content of 1,2 bonds of the butadiene part of between 4% and 65%, a content of trans-1,4 bonds of between 30% and 80%. The copolymers of butadiene-styrene-isoprene suitable are those having a styrene content of between 5 and 50% by weight and, more particularly, 10% and 40%, an isoprene content of between 15% and 60% by weight, and more particularly between 20% and 50% by weight, a butadiene content of between 5 and 50%, and more particularly between 20% and 40% by weight, a content of 1,2 units of the butadiene part of between 4% and 85%, a content of trans-1,4 units of the butadiene part of between 6% and 80%, a content of 1,2 plus 3,4 units of the isoprene part of between 5% and 70%, and a content of trans-1,4 units of the isoprene part Of between 10% and 50%. Of course, the total content of the different bonds is always equal to 100%.

The polymers functionalized with the functionalizing agent satisfying general formula I are particularly suitable for use in order to form rubber compositions comprising silica as reinforcing filler. They possess and confer upon the unvulcanized compositions containing, at least in part or exclusively, silica as reinforcing filler, satisfactory properties of use, in particular an extrudability or a suitability for making strips by means of an extruder compatible with industrial equipment. Furthermore, these polymers make it possible to obtain vulcanized compositions having improved mechanical properties as well as reduced hysteresis, which makes them particularly suitable for use in the manufacture of tires. Particularly suitable are compositions having a base of diene polymers with 80% to 100% functionalized polymer chains.

This effect, which is beneficial with respect to the properties, is obtained with all the precipitated silica known to the person skilled in the art which have a BET surface area which is less than or equal to 450 m²/g, a specific CTAB surface area which is less than or equal to 450 m²/g, even though this improvement is more pronounced with a highly dispersible precipitated silica. By highly dispersible silica there is understood any silica having a very substantial ability of disagglomeration and of dispersion in a polymer matrix as observed by electronic or optical microscopy on thin sections. As non-limitative examples of such preferred highly dispersible silicas mention may be made of those described in European patent applications EP-0 157 703 and EP-0 520 862, or the silica Zeosil 1165 MP of Rhône Poulenc, the silica Perkasil KS 430 of Akzo, or the silica Hi-Sil 2000 of PPG.

The beneficial effect is obtained whatever the physical state in which the silica is present, that is to say whether it is present in the form of a powder, microbeads, granules or balls and whatever the specific surface area of the silica. When silica and carbon black are used together as reinforcing fillers in compositions, improved properties are always obtained in the case of the vulcanized compositions. One can, of course, also use blends of different silicas and use other white fillers.

As carbon blacks, all carbon blacks are suitable and, in particular, all carbon blacks which are commercially available or conventionally used in tires, and in particular in the treads of tires. The amount of carbon black present may vary within wide limits, it being understood, however, that the improvement in the properties will be greater the greater the amount of silica present. The amount of carbon black present is preferably equal to or less than 200% of the amount of silica present in the composition.

The functionalized polymers can be used alone in the rubber compositions or blended with any other diene elastomer, in particular with any elastomer conventionally used in the treads of tires. It is, however, obvious that the greater the proportion of conventional elastomer present in the composition, the less the improvement will be. This is why the conventional elastomer, such as natural rubber, polybutadiene, polyisoprene, a butadiene-styrene copolymer or a butadiene-styrene-isoprene copolymer, etc., may be present in an amount of between 1 and 70 parts by weight to 100 parts of functionalized polymer in accordance with the invention. This conventional elastomer can, of course, itself be a polymer which is entirely or partially functionalized with a functionalizing agent other than one used in the process of the invention or be a coupled or starred polymer including a compound according to general formula I.

The compositions in accordance with the invention may, of course, also contain the other components and additives customarily used in rubber mixes, such as plasticizers, pigments, antioxidants, sulfur, vulcanization accelerators, lengthening oils, one or more silica coupling or bonding agents or silica bonding agents, and/or one or more silica covering agents such as polyols, amines, alkoxysilanes, etc.

The invention is illustrated, but not limited, by the examples, which in no way constitute a limitation on the scope of the invention.

DESCRIPTION OF PREFERRED EMBODIMENTS

In the examples, the properties of the compositions are evaluated as follows:

Modulus of elongation at 300% (ME 300), 100% (ME 100) and 10% (ME 10): measurements effected in accordance with ISO Standard 37

Scott index of breakage: measured at 20° C. and at 100° C.,

Rupture force (RF) in MPa

Elongation upon rupture (ER) in %

Hysteresis losses (HL): measured by rebound at 60° C.

Dynamic properties in shear:
  Measurements as a function of deformation:
    carried out at 10 Hertz with a peak-peak deformation ranging from 0.15% to 50%. The non-linearity expressed is the difference in shear modulus between 0.15% and 50% deformation in MPa. The hysteresis is expressed by the measurement of tan δ at 7% deformation.
  Measurements as a function of temperature:
    carried out at 10 Hertz under a repetitive stress of 20N/cm² with a temperature sweep from −80° C. to 100° C.

The hysteresis is expressed by the measurement of tan δ at 0° C. and 60° C. in accordance with ASTM Standard D2231-71 (reapproved in 1977).

EXAMPLE 1

The object of this example is to describe a batch method of carrying out the process of the preparation of a functionalized polymer in accordance with the invention.

In this example, 6 tests are carried out which are identical except for the variable amounts of functionalizing agents used in each of the tests. Into a 10-liter reactor under nitrogen pressure there are introduced 6.35 l of toluene as solvent, then 500 g of 1,3-butadiene, and finally 250 ppm of THF as vinyl-bond-promoting agent. n-BuLi is then added in an amount suitable to neutralize the impurities present in the reaction medium, after which 0.00300 moles of n-BuLi is added, representing the amount of initiator active for initiating the polymerization. The polymerization is effected at 60° C. for 48 minutes and the conversion percentage measured is 100%. All the polybutadienes have a 1,2 bond content of 23%, a trans-1,4 bond content of 44%, and a cis-1,4 bond content of 33%.

In the reactor containing the polybutadiene having a C-lithium living end, GPTSI (sold by Hüls under the commercial name DYNASYLAN GLYMO) is added with intense agitation in variable quantities suitable for each of the tests. The functionalization reaction is carried out at 60° C. In control test 1, methanol is added in place of GPTSI in an amount such that there is a ratio of methanol to initiator of 2. Three minutes after the addition of the GPTSI or methanol, 0.5 part per 100 parts of 4,4'-methylene-bis-2,6-ditertiobutyl phenol elastomer is added as oxidizing agent. The polybutadiene obtained for each of the tests if coagulated in methanol and dried at 50° C. under reduced pressure for 36 hours.

For each of the polymers, the final inherent viscosity, the Mooney viscosity (1+4 at 100° C.), the number molecular weight (Mn) determined by osmometry, the contents of epoxy functions and silicon atoms, the apparent degree of starring, and the viscosity jump are measured.

The measurement of the contents of epoxy functions and silicon atoms is effected in the following manner: For each of the tests, 10 g of the modified polymer are taken and subjected to an extraction by several dissolution cycles by means of carbon disulfide and then to a coagulation in methanol in order to eliminate the presence of any residual trace of agent having the formula I, that is to say which is not bound to the polymer. The $^1$H NMR spectrum of the polymer is characterized by a block at 2.9 ppm corresponding to the chemical displacement of the CH—O unit of the epoxy function and by a block at 0.5 ppm corresponding to the chemical displacement of the SiCH$_2$ unit.

Based on the spectrum obtained for the polymer prepared in test 3, calculation makes it possible to determine that the polymer contains 0.028 units of SiCH$_2$ and 0.026 units of epoxy to 100 butadiene units, which corresponds to 5.2 millimoles of SiCH$_2$ unit and 4.8 millimoles of epoxy unit per kilogram of polymer. The molecular weight of the unmodified polymer is 169,000 g/mole. The values thus obtained make it possible to determine the value of the PF and PV ratios, which are

PF=[0.0052/(1000/169,000)]×1=0.88

PV=(0.0048/0.0052)×1=0.92, respectively.

The results are set forth in Table I.

TABLE I

| Test | MR | Inherent Viscosity | Mooney Viscosity | Mn × 10$^3$ | VJ | ADS | PF | PV |
|---|---|---|---|---|---|---|---|---|
| 1 | 0 | 1.97 | 25 | 169 | — | — | — | — |
| 2 | 0.5 | 2.57 | 82 | 252 | 1.30 | 1.49 | 0.52 | 0.71 |
| 3 | 1.0 | 2.17 | 46 | 195 | 1.12 | 1.15 | 0.88 | 0.92 |
| 4 | 1.5 | 2.11 | 43 | 188 | 1.08 | 1.10 | 0.90 | 0.93 |
| 5 | 3.0 | 2.05 | 34 | 177 | 1.05 | 1.05 | 0.93 | 0.96 |
| 6 | 5.0 | 1.99 | 31 | 171 | 1.01 | 1.01 | 0.95 | 0.97 |

BRIEF DESCRIPTION OF THE DRAWINGS

The distributions of the molecular weights, obtained by chromatography by size exclusion are shown in FIGS. 1 to 4 for the polymers of Tests 1, 2, 4, and 6.

In these figures:

Figure 1:
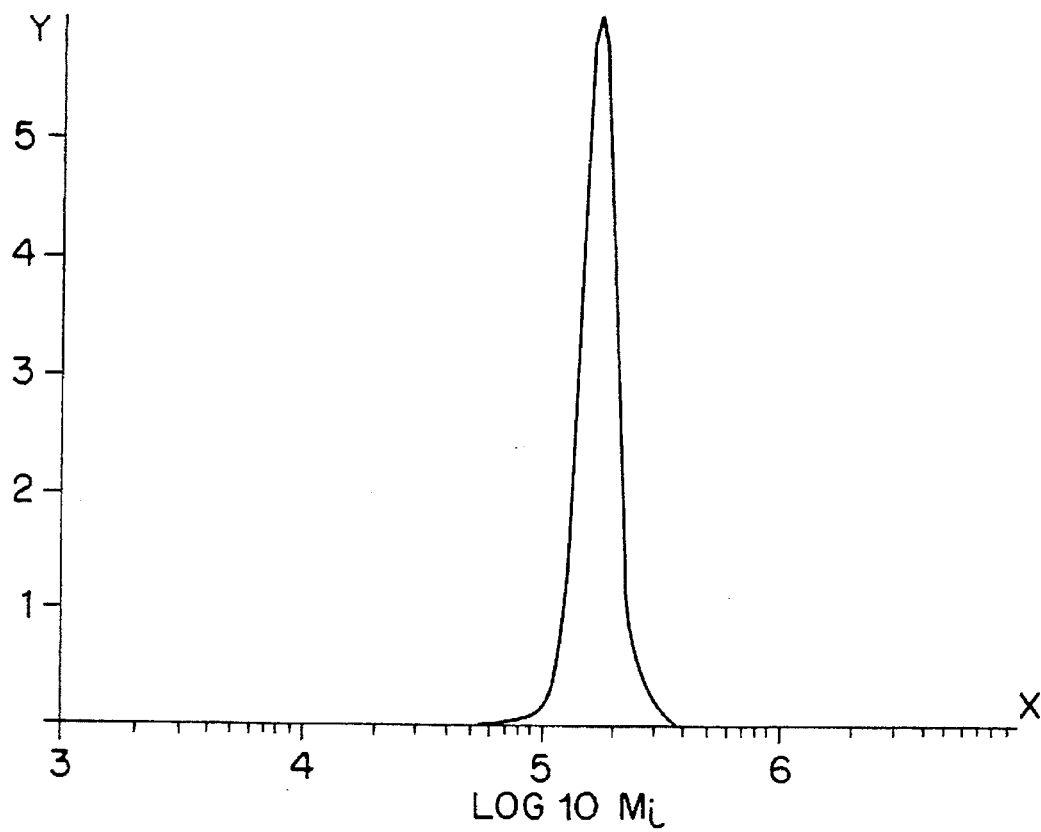
Figure 2:
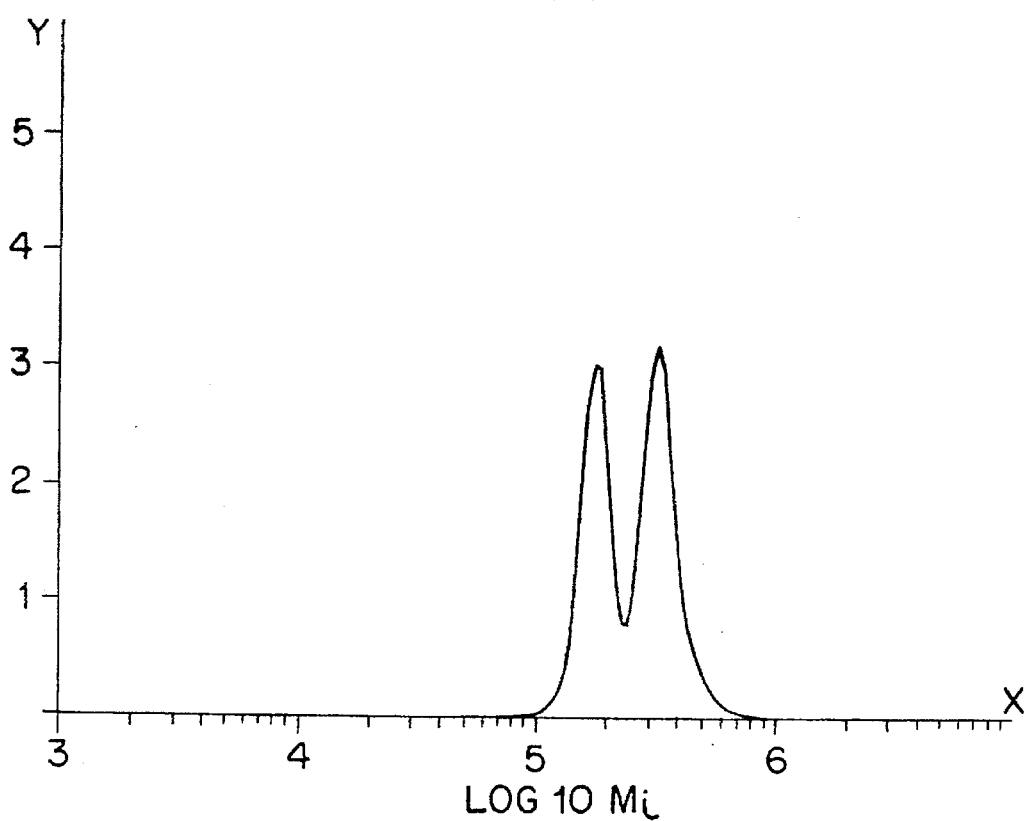
Figure 3:
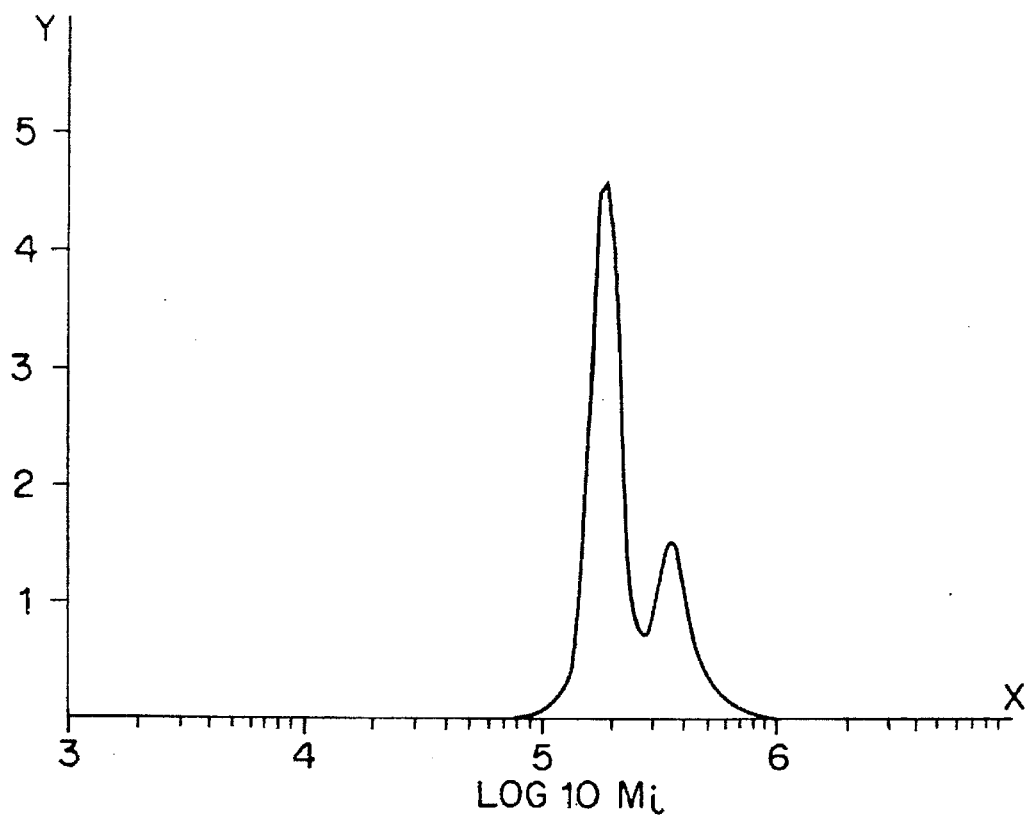
Figure 4:
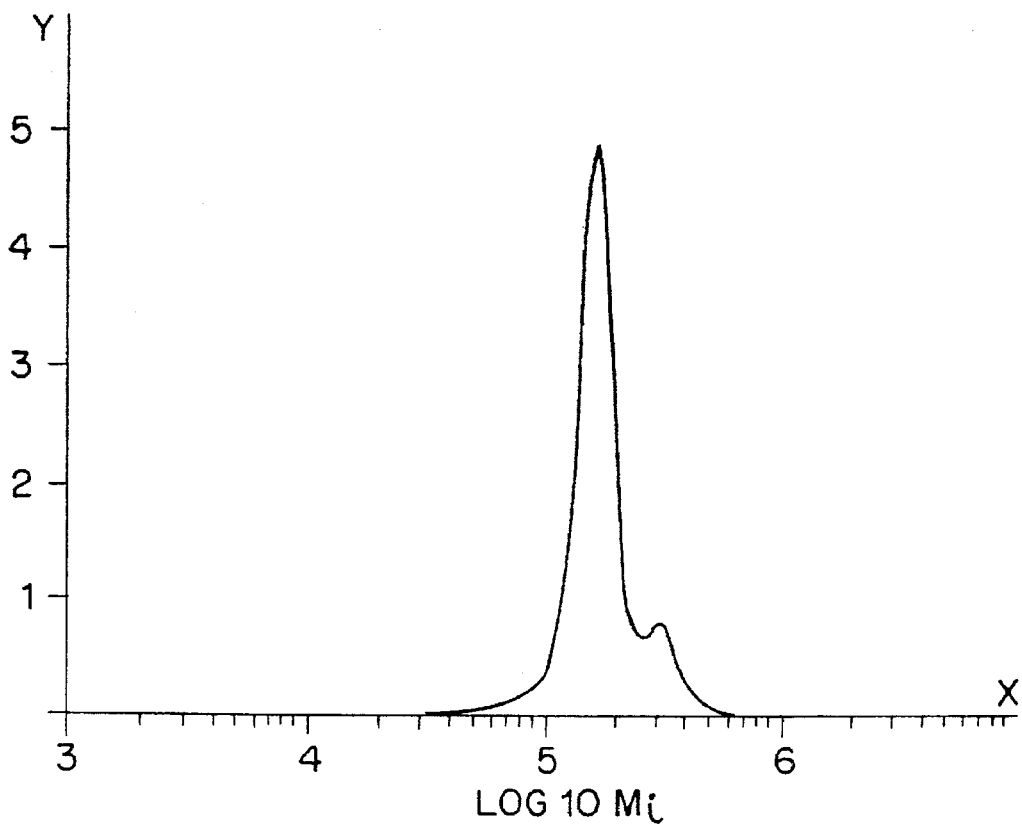

The X axis shows, in logarithmic form to the base 10, a scale of the molecular weights (Mi) in g/mole of polymers. The axis of the molecular weights Mi is calibrated using polybutadiene controls containing 11% of 1,2 bonds and 48% of trans-1,4 bonds.

The Y axis represents an arbitrary scale proportional to the weight of polymer of molecular weight Mi.

The results show that when the ratio MR is equal to or greater than 1, there is exclusively, as in Test 6 or substantially as in Tests 3 to 5, a functionalization reaction, contrary to the coupling reaction which takes place primarily in Test 2 in accordance with the prior art consisting of U.S. Pat. No. 4,185,042. The ADS of the polymer prepared in accordance with Test 2 is high, but nevertheless less than that indicated in said patent, which is ≧2.

EXAMPLE 2

The object of this example is to describe a method for the continuous carrying out the process for the preparation of a butadiene-styrene copolymer functionalized in accordance with the invention and the influence of the mixing and its intensity on the functionalization reaction.

Into a reactor having a useful capacity of 32 liters provided with an agitator of turbine type, there are continuously introduced toluene, butadiene, styrene and THF in a weight ratio of 100:10:4.3:0.3 and a solution of 530 micromoles of active n-BuLi per 100 grams of monomers. The rates of flow of these different solutions are calculated so as to have an average dwell time of 45 minutes, with strong agitation. The temperature is maintained constant at 60° C. At the outlet of the reactor, the measured conversion is 88%. The SBR copolymer contains 26% incorporated styrene and has a content of 41% of 1,2 bonds for the butadiene part.

Upon emergence from the reactor the functionalizing agent is added to the polymer either at the inlet of a conventional static mixer (SM) comprising 26 elements and a volume of 250 ml, or at the inlet of a dynamic mixer (DM) of 250 ml provided with an agitator adjusted to a speed of rotation of 3100 rpm. Eight tests are carried out with different quantities of GPTSI. The functionalization reaction is carried out at 60° C. In the control test 14, methanol is added in place of GPTSI in an amount such that there is a ratio of methanol to initiator of 2. Furthermore, for each of tests 7 to 11 carried out with a ratio MR≧1.00, a control test is effected, indexed b, in which the copolymer is stopped with methanol with a methanol/initiator ratio of 2 as in the four tests 7 to 11, but using an amount of active initiator suitable for obtaining a copolymer having substantially the same inherent viscosity as the functionalized copolymer of each corresponding test. For all the tests, after 2 minutes, 0.8 part per hundred parts of copolymer of 2,2'-methylene bis(4-methyl-6-tertiobutyl phenol) and 0.2 part of N-(1,3-dimethylbutyl)-N'-phenyl-p-phenylenediamine are added as antioxidants. The copolymer is recovered by conventional steam stripping of the solvent and then dried in the oven at 50° C. The inherent viscosities are measured before the stripping operation.

The results are set forth in Table II.

TABLE II

| Test | MR | Mixer | Inherent Viscosity | Mooney Viscosity | Mn × 10$^3$ | VJ | ADJ | PF | PV |
|---|---|---|---|---|---|---|---|---|---|
| 7 | 4.13 | SM | 2.28 | 84 | 196 | 1.09 | 1.11 | 0.90 | 0.94 |
| 7b | 0 | SM | 2.26 | 82 | — | — | — | — | — |
| 8 | 3.00 | DM | 2.12 | 72 | 184 | 1.01 | 1.05 | 0.94 | 0.96 |
| 8b | 0 | SM | 2.10 | 69 | — | — | — | — | — |
| 9 | 2.00 | DM | 2.10 | 70 | 178 | 1.00 | 1.01 | 0.95 | 0.98 |
| 9b | 0 | SM | 2.10 | 69 | — | — | — | — | — |
| 10 | 1.65 | SM | 2.33 | 86 | 207 | 1.11 | 1.18 | 0.86 | 0.92 |
| 10b | 0 | SM | 2.30 | 85 | — | — | — | — | — |
| 11 | 1.00 | DM | 2.23 | 77 | 187 | 1.06 | 1.06 | 0.92 | 0.94 |
| 11b | 0 | SM | 2.20 | 76 | — | — | — | — | — |
| 12 | 0.83 | SM | 2.43 | 91 | 220 | 1.16 | 1.25 | 0.78 | 0.86 |
| 13 | 0.20 | SM | 2.62 | 109 | 240 | 1.25 | 1.36 | 0.22 | 0.36 |
| 14 | 0 | SM | 2.10 | 68 | 176 | — | — | — | — |

The results of Tests 7 to 11 show that the functionalization is greater when the mixing of two components is effected by means of a dynamic mixer, that is to say when the intensity of the mixing is great; this makes it possible to functionalize with a ratio MR approaching 1, which ratio is economically of interest from an industrial standpoint.

The values concerning Tests 8and 9 show that there has been practically exclusively a functionalization reaction on the silicon, while those concerning Tests 12 and 13 show that there is an extensive coupling and/or starring, primarily by opening of the epoxy function.

This example shows that by judicial selection of the mixing process it is possible to exert control over the value of the molar ratio MR and therefore to direct and control the functionalization reaction.

Tests 7 to 11also show by comparison with the polymers of the corresponding control tests of the same inherent viscosity before stripping that the polymers functionalized in accordance with the process of the invention do not lead to a development of macrostructure upon the stripping operation as shown by the Mooney viscosity index.

EXAMPLE 3

The object of this example is to prepare a butadiene-styrene-isoprene copolymer functionalized by the process in accordance with the invention.

Into a reactor of a useful capacity of 32 liters having an agitator of turbine type there are continuously introduced toluene, butadiene, styrene, isoprene and THF in a weight ratio of 100:3.0:4.0:0:4.1:0.06 and a solution of 410 micromoles of active n-BuLi to 100 g of monomers. The rates of flow of these different solutions are calculated so as to have a dwell time of 45 minutes. The temperature is maintained constant at 75° C. At the outlet of the reactor, the measured conversion is 81%. The terpolymer SBIR contains 25% incorporated styrene and 33% incorporated butadiene having a content of 1,2 bonds of 25% while the content of 3,4 bonds for the isoprene portion is 20%.

Upon emergence from the reactor, the GPTSI is added to the inlet of a static mixer, comprising 26 elements and a volume of 250 ml, to the living polymer.

The functionalization reaction is carried out at 60° C. In control test 16, methanol is added in place of the GPTSI in an amount such that there is a ratio of methanol to initiator of 2. After 2 minutes, 0.8 part per hundred parts of copolymer of 2,2'-methylene bis(4-methyl-6-tertiobutylphenol) and 0.2 part of N-(1,3-dimethylbutyl)-N'-phenyl-p-phenylenediamine are added as antioxidants. The copolymer is recovered, then subjected to the conventional steam stripping operation, and then dried in the oven at 50° C. The inherent viscosities are measured before the stripping operation.

The results are set forth in Table III.

EXAMPLE 4

The object of this example is to describe the preparation of copolymers functionalized with different functionalizing agents in order to show the excellent properties of the rubber compositions containing silica as reinforcing filler and comprising a polymer functionalized with a functionalizing agent having general formula I.

Seven polymers are prepared in accordance with the method of synthesis described in Example 2 and which is distinguished therefrom only by the fact that the amount of active initiator used is adjusted in such a manner that the value of the Mooney viscosity index of each functionalized polymer is 70±3. The inherent viscosity was measured before and after functionalization before stripping in order to be able to determine the viscosity jump VJ. The 7 polymers have the same microstructure as those prepared in Example 2.

In order to carry out 5 tests, the following functionalizing agents are used:

For Test A, GPTSI
For Test A', ECETSI
For Test B, propyltrimethoxysilane (PTSI)
For Test C, 3-chloropropyltrimethoxysilane (CPTSI)
For Test D, TMSI In order to carry out the last 2 tests, which are control tests, GPTSI is used as starring agent for Test E under the conditions of U.S. Pat. No. 4 185 042, while for Test T an SBR which is simply stopped with methanol is prepared. For the 7 tests the same static mixer was used as that described in Example 2.

The polymer functionalized with TMSI is collected in the manner described in Example 1 and not in the manner described in Example 2, since the use Of TMSI as functionalizing agent and not as coupling or starring agent leads to an unavoidable development of macrostructure upon the stripping operation, as shown by the Mooney viscosity values measured, which extend from 78 to 107 in accordance with a development which is well-known to the person skilled in the art.

The results are set forth in Table IV.

TABLE IV

| Test | Funcional-izing Agent | MR | Inherent Viscosity | Mooney Viscosity | VJ | Mn × 10³ | PF |
|---|---|---|---|---|---|---|---|
| A | GPTSI | 2.0 | 2.16 | 72 | 1.08 | 180 | 0.91 |
| A' | ECETSI | 2.0 | 2.12 | 70 | 1.00 | 178 | 0.95 |
| B | PTSI | 1.5 | 2.14 | 73 | 1.02 | 185 | 0.93 |
| C | CPTSI | 1.5 | 2.18 | 70 | 1.02 | 180 | 0.90 |
| D | TMSI | 2.6 | 2.10 | 68 | 1.07 | 175 | 0.90 |
| E | GPTSI | 0.2 | 2.08 | 72 | 1.32 | 180 | 0.19 |
| T | MOEH | 1.5 | 2.12 | 70 | — | 182 | 0 |

The absence of development in Tests A and A' upon the stripping will be noted as shown by the ratio of the Mooney

TABLE III

| Test | Functional-izing Agent | MR | Inherent Viscosity | Mooney Viscosity | Mn × 10³ | VJ | ADS | PF | PV |
|---|---|---|---|---|---|---|---|---|---|
| 15 | GPTSI | 2.0 | 2.38 | 69 | 220 | 1.10 | 1.16 | 0.88 | 0.91 |
| 16 | — | — | 2.16 | 54 | 190 | — | — | — | — | viscosity to the inherent viscosity before stripping, which is very close to that of the control T stopped with methanol.

EXAMPLE 5

The 7 copolymers obtained in Example 4 are studied in a composition reinforced exclusively by silica as reinforcing filler and adapted to form a passenger-car tire tread.

Each composition is produced in accordance with the method described in European Patent Application EP 0 501 227, which is herewith incorporated in the present application, it being pointed out that thermo-mechanical working is effected in two steps, they lasting 5 and 4 minutes respectively, for an average speed of the pallets of 45 rpm until reaching a maximum identical temperature of decrease of 160° C., while the finishing step is carried out at 30° C.

The following formulation is used to produce the 7 compositions, all the parts being expressed by weight:

Elastomer: 100

Silica (*): 75

Aromatic oil (d): 37.5

Bonding agent (**): 6

Zinc oxide: 2.5

Stearic acid: 1.5

Antioxidant (a): 1.9

Paraffin wax (b): 1.5

Sulfur: 1.1

Sulfenamide (c): 2

Diphenyl guanidine: 1.5

(*) the silica is a highly dispersible silica in the form of microbeads marketed by Rhône Poulenc under the trade name Zeosil 1165 MP.
(**) polysulfur organosilane marketed by Degussa under the name SI 69.
(a) antioxidant: N-(1,3-dimethylbutyl)-N'-phenyl-p-phenylenediamine
(b) paraffin wax: mixture of macrocrystalline and microcrystalline waxes
(c) sulfenamide: N-cyclohexyl-2-benzothiazyl sulfenamide
(d) aromatic oil: ENERFLEX 65, marketed by BP The vulcanization is carried out at 150° C. for 40 minutes. The properties of these 7 compositions are compared with each other, both in unvulcanized state and in vulcanized state.

The results are set forth in Table V.

TABLE V

| Composition | SBR A | SBR A' | SBR B | SBR C | SBR D | SBR E | SBR T |
|---|---|---|---|---|---|---|---|
| Properties in unvulcanized state | | | | | | | |
| Mooney | 88 | 90 | 92 | 92 | 90 | 68 | 76 |
| Properties in vulcanized state | | | | | | | |
| Shore Hardness | 65 | 65 | 66 | 65 | 64 | 66 | 66 |
| ME10 | 4.50 | 4.55 | 5.10 | 4.90 | 4.40 | 5.00 | 5.40 |
| ME100 | 1.62 | 1.65 | 1.70 | 1.70 | 1.60 | 1.65 | 1.75 |
| ME300 | 1.97 | 2.03 | 1.99 | 2.03 | 2.00 | 1.90 | 1.78 |
| ME300/ME100 | 1.22 | 1.23 | 1.17 | 1.19 | 1.25 | 1.15 | 1.01 |
| Scott breakage indexes | | | | | | | |
| 20° C. RF | 23.5 | 24 | 22.5 | 22 | 23 | 21.5 | 22 |
| 20° C. ER% | 590 | 600 | 630 | 610 | 600 | 600 | 650 |
| 100° C. RF | 9 | 9.1 | 8.9 | 8.2 | 8.8 | 8.5 | 8.5 |
| 100° CAR% | 400 | 400 | 420 | 380 | 390 | 400 | 450 |
| HL at 60° C. | 24.5 | 24.5 | 27 | 25 | 24 | 30 | 32 |
| Dynamic properties as a function of deformation | | | | | | | |
| ΔG at 23° C. | 2.20 | 2.25 | 3.30 | 2.70 | 2.10 | 3.30 | 4.50 |

TABLE V-continued

| Composition | SBR A | SBR A' | SBR B | SBR C | SBR D | SBR E | SBR T |
|---|---|---|---|---|---|---|---|
| tan δ at 23° C. | 0.27 | 0.27 | 0.31 | 0.29 | 0.26 | 0.31 | 0.39 |
| Dynamic properties as a function of temperature | | | | | | | |
| tan δ at 0° C. | 0.54 | 0.54 | 0.54 | 0.54 | 0.54 | 0.54 | 0.52 |
| tan δ at 60° C. | .140 | .140 | .150 | .145 | .140 | .155 | .180 |

*The deformation for this hysteresis loss is 34%.

It is noted, with respect to the properties in vulcanized state, that on the one hand, as a whole, the mechanical resistance of the functionalized compositions A and A' is very close to that of composition D and slightly greater to that of compositions B and C, which is favorable with respect to resistance to wear of a tire provided with a tread formed by such a composition, and that, on the other hand, the hysteresis properties both with strong and small deformations are improved as compared with those exhibited by compositions B and C and very close to those exhibited by composition D, which is favorable in order to decrease the resistance to rolling of a tire provided with a tread formed of such a composition and in order to constitute a tread underlayer or a sidewall rubber. It is noted that the functionalized copolymers A and A' have properties definitely superior to those of the polymer SBR E starred with GPTSI as well as of the polymer SBR T stopped with methanol.

In other words, the polymers and copolymers functionalized with a functionalizing agent of general formula I make it possible to obtain compositions having substantially the same rubbery properties as those obtained with a composition having a base of a polymer functionalized in the laboratory by means Of TMSI but still not leading to developments of macrostructure upon the stripping operation.

EXAMPLE 6

The object of this example is to show that the improved properties are obtained whatever the specific surface area of the silica and whatever its form of presentation.

In this example, two series of tests are carried out, one employing a silica in the form of microbeads which has a specific BET surface area of 85 m²/g sold under the trade name Zeosil 85 MP by Rhône Poulenc, the other employing a precipitated silica in the form of granules, marketed by Degussa under the trade name Ultrasil VN3 and having a CTAB specific surface area of 170 m²/g.

For both series of tests, with the formulation described in Example 4, three compositions are prepared with the functionalized copolymers A and B prepared in Example 4, the third composition being made with the same unfunctionalized SBR T, serving as control composition.

The results are set forth in Table VI.

TABLE VI

| | ZEOSIL 85 MP | | | ULTRASIL VN3 | | |
|---|---|---|---|---|---|---|
| Composition | SBR A | SBR B | SBR T | SBR A | SBR B | SBR T |
| Mooney | 66 | 72 | 57 | 86 | 92 | 71 |
| Properties in unvulcanized state | | | | | | |
| Shore Hardness | 60 | 61 | 63 | 63 | 64 | 66 |

TABLE VI-continued

| | ZEOSIL 85 MP | | | ULTRASIL VN3 | | |
|---|---|---|---|---|---|---|
| Composition | SBR A | SBR B | SBR T | SBR A | SBR B | SBR T |
| ME10 | 3.60 | 3.80 | 4.00 | 4.20 | 4.90 | 5.20 |
| ME100 | 1.82 | 1.85 | 1.90 | 1.72 | 1.80 | 1.85 |
| ME300 | 2.93 | 2.86 | 2.75 | 2.03 | 2.01 | 1.87 |
| ME300/ ME100 | 1.61 | 1.55 | 1.45 | 1.18 | 1.12 | 1.01 |
| Scott Breakage Indexes | | | | | | |
| 20° C. RF | 16.5 | 15.5 | 15 | 18.5 | 16.5 | 16 |
| 20° C. ER% | 420 | 400 | 450 | 520 | 500 | 600 |
| 100° C. RF | 5.5 | 5.1 | 4.8 | 7.0 | 6.5 | 6 |
| 100° C. ER% | 230 | 200 | 260 | 330 | 300 | 330 |
| HL at 60° C.* | 14.5 | 15 | 19 | 20.5 | 24 | 29 |
| Dynamic properties as a function of deformation | | | | | | |
| ΔG at 23° C. | 1.00 | 1.20 | 1.60 | 1.50 | 1.70 | 2.70 |
| tan δ at 23° C. | 0.15 | 0.16 | 0.20 | 0.21 | 0.23 | 0.30 |
| Dynamic properties as a function of temperature | | | | | | |
| tan δ at 0° C. | 0.30 | 0.30 | 0.30 | 0.42 | 0.42 | 0.42 |
| tan δ at 60° C. | .070 | .070 | .100 | .110 | .118 | .140 |

*The deformation for this hysteresis loss is 37% for the silica Zeosil 85 MP and 34% for the silica Ultrasil VN3.

It is noted that, whatever the specific surface area of the silica and whatever the form of presentation, microbeads or granules, the compositions employing the functionalized copolymers A have, as a whole, interesting reinforcing properties (ME300/ME100)and, in particular, hysteresis properties with strong and small deformations which are substantially improved as compared with those exhibited by the other compositions. Thus the compositions in accordance with the invention having a base of polymers and copolymers functionalized with a functionalizing agent of general formula I are particularly suitable for forming treads and tires having improved properties with respect to resistance to wear and resistance to rolling.

EXAMPLE 7

The object of this example is to show that the compositions using a polymer functionalized with a functionalizing agent of general formula I have improved properties when the reinforcing filler is not formed exclusively of silica but, for instance, of a carbon-black/silica blend.

In this example, the following formulation is used, while repeating the manner of operation of Example 4.

Elastomer: 100
Silica (*): 40
Carbon black N234: 40
Aromatic oil (d): 37.5
Bonding agent (**): 3.2
Zinc oxide: 2.5
Stearic acid: 1.5
Antioxidant (a): 1.9
Paraffin wax (b): 1.5
Sulfur: 1.1
Sulfenamide (c): 2
Diphenyl guanidine: 0.75

(*), (**), (a), (b), (c), (d): identical to those used in Example 5.
The results are set forth in Table VII.

TABLE VII

| Composition | SBR A | SBR B | SBR T |
|---|---|---|---|
| Properties in raw state | | | |
| Mooney | 83 | 86 | 72 |
| Properties in vulcanized state | | | |
| Shore hardness | 61 | 63 | 64 |
| ME10 | 3.90 | 4.10 | 4.55 |
| ME100 | 1.51 | 1.51 | 1.50 |
| ME300 | 1.93 | 1.89 | 1.74 |
| ME300/ME100 | 1.28 | 1.24 | 1.16 |
| Scott breaking index at | | | |
| 20° C. RF | 20 | 20.5 | 19 |
| 20° C. ER% | 600 | 610 | 620 |
| 100° C. RF | 10.5 | 9.9 | 9.5 |
| 100° C. ER% | 450 | 450 | 500 |
| HL at 60° C. | 32.5 | 33.5 | 39 |
| Dynamic properties as a function of deformation | | | |
| ΔG at 23° C. | 3.40 | 4.40 | 6.30 |
| tan δ at 23° C. | 0.35 | 0.38 | 0.43 |
| Dynamic properties as a function of temperature | | | |
| tan δ at 0° C. | 0.70 | 0.70 | 0.67 |
| tan δ at 60° C. | 0.180 | 0.200 | 0.220 |

*The deformation for this hysteresis loss is 35%.

It is noted that the properties of the composition comprising the polymer functionalized by means of the compound of general formula I are improved, in the case of a carbon-black/silica blend, as compared with those of the other compositions.

We claim:

1. A process of preparing diene polymers functionalized by means of an epoxidized alkoxysilane compound said functionalized polymers having the general formula $(Y)_m$—$R^1$—$Si(OR^2)_2$—$P$ in which P is the chain of a diene polymer, said process consisting in preparing by catalysis with a polymerization initiator, a living diene polymer and characterized by the fact that there is added, by mixing, to the living polymer a functionalizing agent having the general formula:

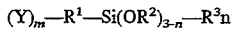

in which

Y represents the radical

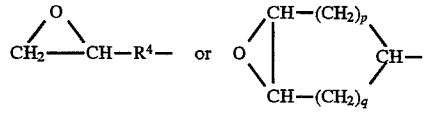

$R^1$ represents an alkyl, cycloalkyl, or aryl radical having from 1 to 10 carbon atoms, $R^2$ represents an alkyl, aryl, cycloalkyl, alkaryl, or aralkyl radical having from 1 to 12 carbon atoms, $R^3$ represents an alkyl, aryl or alkaryl radical having from 1 to 12 carbon atoms, $R^4$ represents a hydrocarbon radical having from 1 to 6 carbon atoms and which may comprise one or more oxygen atoms in the hydrocarbon chain, n is a whole number selected from among the values 0 and 1, m is a whole number selected from among the values 1 and 2, p and q are whole numbers selected from among the values 0, 1, 2, 3 and 4, it being understood that the sum of p+q must represent a whole number between 2 and 5 inclusive, in an amount such that the molar ratio (MR) of functionalizing agent to number of active sites of the initiator is equal to or greater than 1; that the agent and the living polymer are allowed to react; and that the functionalized polymer is recovered.

2. A process according to claim 1, characterized by the fact that the functionalized polymer simultaneously satisfies the two relationships:

$$PF = \frac{Ns}{Np \times (fn)} \geq 0.85 \text{ and } PV = \frac{Ne}{Ns \times m} \geq 0.90$$

in which:
  Ns represents the number of moles of silicon bound to one polymer chain end of the functionalized polymer,
  Np represents the number of polymer moles before functionalization,
  f(n) represents the functionality of the polymerization initiator,
  Ne represents the number of moles of epoxy function bound to a polymer chain end of the functionalized polymer,
  m has the meaning previously indicated.

3. A process according to claim 1, characterized by the fact that the characteristic mixing time of the functionalizing agent with the living polymer is less than or equal to, and preferably far less than, the characteristic time of reaction between the two components and furthermore less than and preferably much less than the characteristic time of molecular diffusion of the components.

4. A process according to claim 1, characterized by the fact that the reaction between the living polymer and the functionalization compound is effected at a temperature below 120° C. and preferably between 30° C. and 90° C.

5. A process according to claim 1, characterized by the fact that the functionalized polymer is subjected to stripping.

6. Functionalized diene polymers having 70% to 100% of molecules having the formula:

$(Y)_m$—$R^1$—$Si(OR^2)_2$—P when the polymerization initiator is monofunctional, or 60% to 100% of polymer chain ends having the formula $(Y)_m$—$R^1$—$Si(OR^2)_2$—P' when the polymerization initiator is polyfunctional in which
  Y, $R^1$, $R^2$ and m have the meanings as in claim 1,
  P and P' represent the chain of a homopolymer of 1,3-butadiene, of 2,3-di($C_1$ to $C_5$ alkyl)-1,3-butadiene, of an aryl-1,3-butadiene, of 1,3-pentadiene, of 2,4-hexadiene, or of a copolymer of at least two monomeric conjugated dienes selected from the group consisting of 1,3-butadiene, 2-methyl-1,3-butadiene, 2,3-di($C_1$ to $C_5$ alkyl)-1,3-butadiene, an aryl 1,3-butadiene, 1,3-pentadiene, and 2,4-hexadiene or a copolymer of one of more conjugated diene compounds selected from the group consisting of 1,3-butadiene, 2-methyl-1,3-butadiene, 2,3-di($C_1$ to $C_5$ alkyl)-1,3-butadiene, an aryl 1,3-butadiene, 1,3-pentadiene and 2,4-hexadiene with one or more aromatic vinyl compounds and having a Mooney viscosity of between 10 and 150.

7. Polymers according to claim 6, characterized by the fact that the polymer chain represents that of a polybutadiene or of a butadiene-styrene copolymer or of a butadiene-styrene-isoprene terpolymer.

8. A sulfur-vulcanizable rubber composition having the base of a functionalized diene polymer, said functional diene polymer having the general formula $(Y)_m$—$R^1$—Si $(OR^2)_2$—P in which P is the chain of a diene polymer, said composition characterized by the fact that it comprises silica as reinforcing filler and by the fact that the diene polymer is a polymer functionalized with a functionalizing agent having the general formula:

$$(Y)_m—R^1—Si(OR^2)_{3-n}—R^3{}_n$$

in which
  Y represents the radical

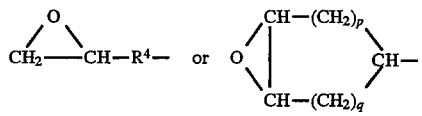

$R^1$ represents an alkyl, cycloalkyl or aryl radical having from 1 to 10 carbon atoms,
  $R^2$ represents an alkyl, aryl, cycloalkyl, alkaryl or aralkyl radical having from 1 to 12 carbon atoms,
  $R^3$ represents an alkyl, aryl or alkaryl radical having from 1 to 12 carbon atoms,
  $R^4$ represents a hydrocarbon radical having from 1 to 6 carbon atoms and which may comprise one or more oxygen atoms in the hydrocarbon chain,
  n is a whole number selected from among the values 0 and 1,
  m is a whole number selected from among the values 1 and 2,
  p and q are whole numbers selected from among the values 0, 1, 2, 3 and 4, it being understood that the sum of p+q must represent a whole number between 2 and 5 inclusive, which simultaneously satisfies the two relationships:

$$PF = \frac{Ns}{Np \times (fn)} \geq 0.85 \text{ and } PV = \frac{Ne}{Ns \times m} \geq 0.90$$

in which:
  Ns represents the number of moles of silicon bound to one polymer chain end of the functionalized polymer,
  Np represents the number of polymer moles before functionalization,
  f(n) represents the functionality of the polymerization initiator,
  Ne represents the number of moles of epoxy function bound to a polymer chain end of the functionalized polymer,
  m has the meaning indicated above.

9. A composition according to claim 8, characterized by the fact that the functionalized polymer comprises 80 to 100% of functionalized chains.

10. A rubber composition according to claim 8, characterized by the fact that the functionalizing agent is selected from among 3-glycidoxypropyltrimethoxysilane and 2-(3,4-epoxycyclohexyl)-ethyltrimethoxysilane.

11. A composition according to claim 8, characterized by the fact that the silica is a precipitation silica having a BET surface area which is less than or equal to 450 m²/g, and a specific CTAB surface area which is less than of equal to 450 m²/g.

12. A composition according to claim 11, characterized by the fact that the silica is a highly dispersible silica in the form of powder, microbeads, balls, or granules.

13. A composition according to claim 8, characterized by the fact that the functionalized diene polymer is selected from the group consisting of polybutadiene, and butadiene-styrene copolymer or butadiene-styrene-isoprene copolymer.

14. A composition according to claim 13, characterized by the fact that the butadiene-styrene copolymer has a content of 1,2 bonds of between 4% and 65%.

15. A composition according to claim 8, characterized by the fact that it comprises from 1 to 70 parts by weight of at least one other diene elastomer selected from the group consisting of natural rubber, polybutadiene, polyisoprene, butadiene-styrene, and butadiene-styrene-isoprene.

16. A composition according to claim 8, characterized by the fact that it furthermore comprises carbon black.

17. A composition according to claim 16, characterized by the fact that the amount of carbon black is $\leq 200\%$ referred to the amount of silica present.

18. A tire tread, characterized by the fact that it comprises silica as reinforcing filler and a functionalized diene polymer having the general formula $(Y)_m$—$R^1$—$Si(OR^2)_2$—P in which P is the chain of a diene polymer, and in which the diene polymer is functionalized with a functionalizing agent having the general formula

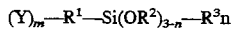

in which

Y represents the radical

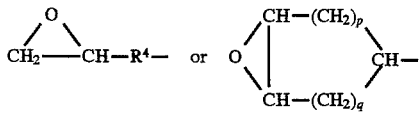

$R^1$ represents an alkyl, cycloalkyl or aryl radical having from 1 to 10 carbon atoms, $R^2$ represents an alkyl, aryl, cycloalkyl, alkaryl or aralkyl radical having from 1 to 12 carbon atoms, $R^3$ represents an alkyl, aryl or alkaryl radical having from 1 to 12 carbon atoms, $R^4$ represents a hydrocarbon radical having from 1 to 6 carbon atoms and which may comprise one or more oxygen atoms in the hydrocarbon chain, n is a whole number selected from among the values 0 and 1, m is a whole number selected from among the values 1 and 2, p and q are whole numbers selected from among the values 0, 1, 2, 3 and 4, it being understood that the sum of p+q must represent a whole number between 2 and 5 inclusive, which simultaneously satisfies two relationships:

$$PF = \frac{Ns}{Np \times (fn)} \geq 0.85 \text{ and } PV = \frac{Ne}{Ns \times m} \geq 0.90$$

in which:

Ns represents the number of moles of silicon bound to one polymer chain end of the functionalized polymer, Np represents the number of polymer moles before functionalization, f(n) represents the functionality of the polymerization initiator, Ne represents the number of moles of epoxy function bound to a polymer chain end of the functionalized polymer, m has the meaning indicated above.

19. A tire tread according to claim 18, characterized by the fact that the functionalizing agent is selected from among 3-glycidoxypropyltrimethoxysilane and 2-(3,4-epoxycyclohexyl)-ethyltrimethoxysilane.

20. A tire tread according to claim 18, characterized by the fact that the silica is a precipitation silica having a BET surface area which is less than or equal to 450 m²/g, and a specific CTAB surface area which is less than of equal to 450 m²/g and preferably highly dispersible.

21. A tire tread according to claim 18, characterized by the fact that the functionalized diene polymer is selected from among the group consisting of polybutadiene and butadiene-styrene copolymer or butadiene-styrene-isoprene copolymer.

22. A tire tread according to claim 21, characterized by the fact that the butadiene-styrene copolymer has a content of 1,2 bonds of between 4% and 65%.

23. A tire having a reduced resistance to rolling, characterized by the fact that it has a tread comprising silica as filler and a functionalized diene polymer having the general formula $(Y_m)$—$R^1$—$Si(OR^2)_2$—P in which P is the chain of a diene polymer and in which the diene polymer is functionalized with a functionalizing agent having the general formula

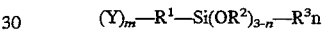

in which

Y represents the radical

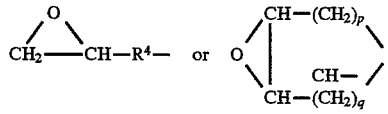

$R^1$ represents an alkyl, cycloalkyl or aryl radical having from 1 to 10 carbon atoms, $R^2$ represents an alkyl, aryl, cycloalkyl, alkaryl or aralkyl radical having from 1 to 12 carbon atoms, $R^3$ represents an alkyl, aryl or alkaryl radical having from 1 to 12 carbon atoms, $R^4$ represents a hydrocarbon radical having from 1 to 6 carbon atoms and which may comprise one or more oxygen atoms in the hydrocarbon chain, n is a whole number selected from among the values 0 and 1, m is a whole number selected from among the values 1 and 2, p and q are whole numbers selected from among the values 0, 1, 2, 3 and 4, it being understood that the sum of p+q must represent a whole number between 2 and 5 inclusive, which simultaneously satisfies the two relationships:

$$PF = \frac{Ns}{Np \times (fn)} \geq 0.85 \text{ and } PV = \frac{Ne}{Ns \times m} \geq 0.90$$

in which:

Ns represents the number of moles of silica bound to a polymer chain end of the functionalized polymer, Np represents the number of polymer moles before functionalization, f(n) represents the functionality of the polymerization initiator, Ne represents the number of moles of epoxy function bound to a polymer chain end of the functionalized polymer, m has the meaning indicated above.

24. A process of reducing the hysteresis of vulcanized compositions having a base of polymers, characterized by the fact that it consists of adding to a diene polymer, by mixing, a compound of the general formula $(Y)_m$—$R^1$—Si$(OR^2)_{3-n}$—$R^3$n in which Y, $R^1$, $R^2$, $R^3$, n, m, p and q have the same meaning as in claim 1, in an amount such that the molar ratio (MR) of functionalizing agent to number of active sites is equal to or greater than 1, recovering the modified polymer, adding silica and the other customary ingredients to form a sulfur-vulcanizable composition, and vulcanizing the composition.

* * * * *

UNITED STATES PATENT AND TRADEMARK OFFICE
CERTIFICATE OF CORRECTION

PATENT NO. : 5,665,812
DATED : September 9, 1997
INVENTOR(S) : Gorce et al

It is certified that error appears in the above-identified patent and that said Letters Patent is hereby corrected as shown below:

On the title page:
Item 73, "Establissements" should read --Etablissements--;

, 4th line of ABSTRACT, the portion of the formula reading "R" should read --$R^1$--;

Col. 12, line 51, "ADJ" should read --ADS--;

Col. 19, line 54, "one of" should read --one or--;

Col. 20, line 63, "of equal" should read --or equal--;

Col. 22, line 12, "of equal" should read --or equal--.

Signed and Sealed this

Tenth Day of November 1998

*Attest:*

BRUCE LEHMAN

*Attesting Officer*     *Commissioner of Patents and Trademarks*